United States Patent
Chang

(10) Patent No.: US 7,450,404 B2
(45) Date of Patent: Nov. 11, 2008

(54) SWITCHING POWER SUPPLY AND ZVS METHOD THEREOF

(75) Inventor: Shih-Hsien Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 275 days.

(21) Appl. No.: 11/524,569

(22) Filed: Sep. 21, 2006

(65) Prior Publication Data

US 2007/0097713 A1    May 3, 2007

(30) Foreign Application Priority Data

Oct. 31, 2005    (TW) ............... 94138173 A

(51) Int. Cl.
*H02M 3/335*    (2006.01)
*H02M 3/22*    (2006.01)

(52) U.S. Cl. ................... 363/21.03; 363/21.11

(58) Field of Classification Search ............ 363/15, 363/16, 20, 21.01, 21.02, 21.03, 21.04, 21.06, 363/21.08, 21.1, 21.11, 21.18, 97, 131
See application file for complete search history.

(56) References Cited

U.S. PATENT DOCUMENTS

| | | | |
|---|---|---|---|
| 5,430,633 A * | 7/1995 | Smith | 363/20 |
| 5,644,479 A * | 7/1997 | Yoshida et al. | 363/16 |
| 6,366,476 B1 * | 4/2002 | Yasumura | 363/21.02 |
| 2006/0158908 A1 * | 7/2006 | Usui | 363/15 |

* cited by examiner

*Primary Examiner*—Gary L Laxton
(74) *Attorney, Agent, or Firm*—Volpe and Koenig P.C.

(57) ABSTRACT

The provided switching power supply includes an auxiliary circuit having an auxiliary switch and a auxiliary capacitor, a transformer having a primary side coupled to the auxiliary circuit in parallel and a secondary side, an auxiliary switch control circuit coupled to the auxiliary switch and the primary side and fixing a turn-on time of the auxiliary switch, a main switch coupled to the primary side, a ZVS detector coupled to the main switch, a first and a second rectifying switches coupled to the secondary side and a filter circuit coupled to the second rectifying switch in parallel. The provided method includes the steps of: (a) fixing the turn-on time of the auxiliary switch; and (b) generating a fixed turn-off time of the main switch accordingly so as to accomplish ZVS of the main switch.

14 Claims, 5 Drawing Sheets

SWITCHING POWER SUPPLY AND ZVS METHOD THEREOF

FIELD OF THE INVENTION

The present invention relates to the switching power supply and the controlling method thereof. More particularly, the present invention relates to the forward switching and the flyback switching power supplies and the control methods thereof.

BACKGROUND OF THE INVENTION

Generally speaking, a power supply employs a AC/DC converter receiving an inputting commercial AC power and converting the inputting commercial AC power into a DC power having a relatively high voltage level, and employs a DC/DC converter converting the DC power having the relatively high voltage level to a DC power having a relatively low voltage level. The DC power having a relatively low voltage level is employed to operate an electronic device, e.g., using as the power supplies of a desktop and a notebook computers.

Nowadays, the power supplies can be divided into two categories: the linear power supplies and the switching power supplies. Currently, the various switching power supplies are the main streams of the market.

In general, a switching power supply includes an input stage circuit, a PFC stage circuit, a power stage circuit and a feedback stage circuit. In which, the core of the switching power supply is the power stage circuit.

Please refer to FIG. 1, it is a schematic diagram showing the power stage circuit of a conventional switching power supply. In which, the power supply 10 is a forward switching power supply.

In FIG. 1, the switching power supply 10 includes an auxiliary capacitor Ca, a main switch Q1, an auxiliary switch Q2, a transformer T, a driver transformer T1, a zero-voltage switching (ZVS) detector IC 11, a first rectifying switch S1, a second rectifying switch S2, a filter inductor L and a filter capacitor Cb.

The operational principles of the switching power supply 10 of FIG. 1 are described as follows. The input voltage from the previous stage (the PFC stage circuit) is provided to the primary side of the transformer T firstly. The input voltage is rectifying into a DC voltage through the first rectifying switch S1 after the secondary side of the transformer sensing the inputting electrical energy secondly. After the filter inductor L filters the ripples of the DC voltage, the DC voltage is outputted thirdly. The polarities of the voltages on the windings of the transformer are reversed when the main switch Q1 is turned off and the auxiliary switch Q2 is turned on such that the first rectifying switch S1 is turned off, the second rectifying switch S2 is turned on, and the electrical energies stored in the filter inductor L and the filter capacitor Cb are provided to the output terminal Vo through the second rectifying switch S2 fourthly.

Referring to the conventional switching power supply 10 as shown in FIG. 1, the ZVS detector IC 11 is employed to detect the main switch Q1 and cope with the driving of the driver transformer T1 to switch the auxiliary switch Q2 to achieve the alternated turn-on and turn-off of the main switch Q1 and the auxiliary switch Q2 so as to accomplish ZVS of the main switch Q1.

Please refer to FIG. 1, the input voltage V1 is around 400 V high voltage in general. The design of the ZVS detector IC 11, which fulfills the purpose of driving the driver transformer T1 under such a high voltage circumstances, is relatively quite complex.

Keeping the drawbacks of the prior arts in mind, and employing experiments and research full-heartily and persistently, the applicant finally conceived the switching power supply and ZVS method thereof.

SUMMARY OF THE INVENTION

It is therefore an object of the present invention to propose a switching power supply and the ZVS method thereof applying to one of a forward switching power supply and a flyback switching power supply and having relatively lower total manufacturing cost.

According to the first aspect of the present invention, the switching power supply includes an auxiliary circuit having an auxiliary capacitor and an auxiliary switch electrically connected to the auxiliary capacitor in series, a transformer having a primary side electrically connected to the auxiliary circuit in parallel and a secondary side, an auxiliary switch control circuit electrically connected to the auxiliary switch and the primary side of the transformer and fixing a turn-on time of the auxiliary switch, a main switch having a first terminal electrically connected to the primary side of the transformer, a second terminal and a control terminal, a zero-voltage switching (ZVS) detector electrically connected to the first and the control terminals of the main switch, a first and a second rectifying switches electrically connected to the secondary side of the transformer and a filter circuit electrically connected to the second rectifying switch in parallel, wherein the turn-on time of the auxiliary switch is fixed such that a turn-off time of the main switch is also fixed so as to accomplish ZVS of the main switch.

Preferably, the auxiliary switch control circuit includes a driver and a timer.

Preferably, the driver is a primary winding of the transformer.

Preferably, the ZVS detector is employed to detect a zero voltage of the first terminal of the main switch.

Preferably, the auxiliary, the main, the first rectifying and the second rectifying switches are semiconductor switches, and each of the semiconductor switches has a first, a second and a control terminals.

Preferably, the filter circuit includes a filter inductor and a filter capacitor.

According to the second aspect of the present invention, the switching power supply includes an auxiliary circuit having an auxiliary capacitor and an auxiliary switch electrically connected to the auxiliary capacitor in series, a transformer having a primary side electrically connected to the auxiliary circuit in parallel and a secondary side, an auxiliary switch control circuit electrically connected to the auxiliary switch and the primary side of the transformer and fixing a turn-on time of the auxiliary switch, a main switch having a first terminal electrically connected to the primary side of the transformer, a second terminal and a control terminal, a zero-voltage switching (ZVS) detector electrically connected to the first and the control terminals of the main switch, a rectifying switch having a first terminal electrically connected to the secondary side of the transformer, a second terminal and a control terminal and a filter circuit having a first terminal electrically connected to the second terminal of the rectifying switch and a second terminal electrically connected to the secondary side of the transformer, wherein the turn-on time of the auxiliary switch is fixed such that a turn-off time of the main switch is also fixed so as to accomplish ZVS of the main switch.

Preferably, the auxiliary switch control circuit includes a driver and a timer.

Preferably, the driver is a primary winding of the transformer.

Preferably, the ZVS detector is employed to detect a zero voltage of the first terminal of the main switch.

Preferably, the auxiliary, the main and the rectifying switches are semiconductor switches.

Preferably, the filter circuit includes a filter capacitor.

According to the third aspect of the present invention, the controlling method for zero-voltage switching (ZVS) a switching power supply, in which the switching power supply includes a transformer having a primary side and a main and an auxiliary switches electrically connected to the primary side of the transformer, includes the steps of: (a) fixing a turn-on time of the auxiliary switch; and (b) generating a fixed turn-off time of the main switch accordingly so as to accomplish ZVS of the main switch.

Preferably, the switching power supply is one of a forward switching power supply and a flyback switching power supply.

The present invention may best be understood through the following descriptions with reference to the accompanying drawings, in which:

DETAILED DESCRIPTION OF THE PREFERRED EMBODIMENT

Figure 1:
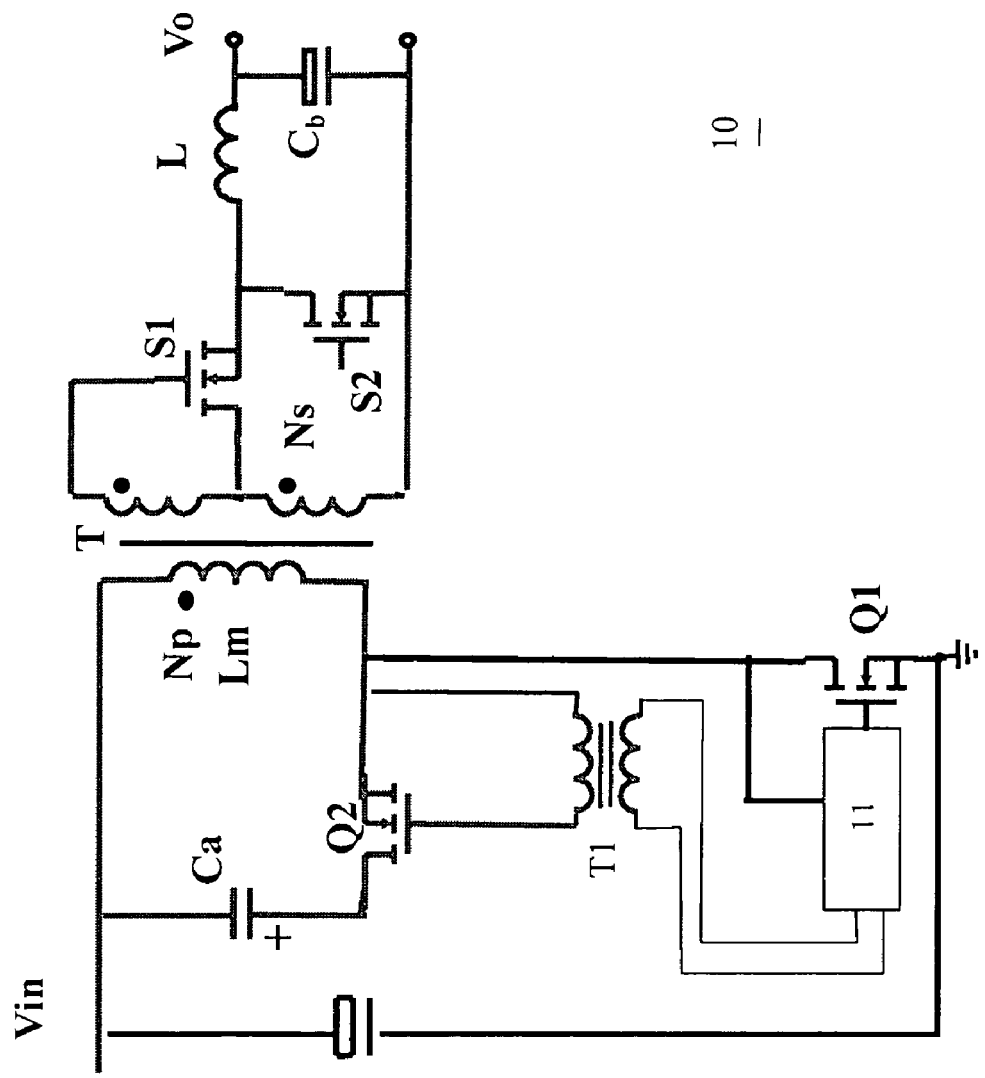
FIG. 1 is a schematic diagram showing the power stage circuit of a conventional switching power supply.
Figure 2A:
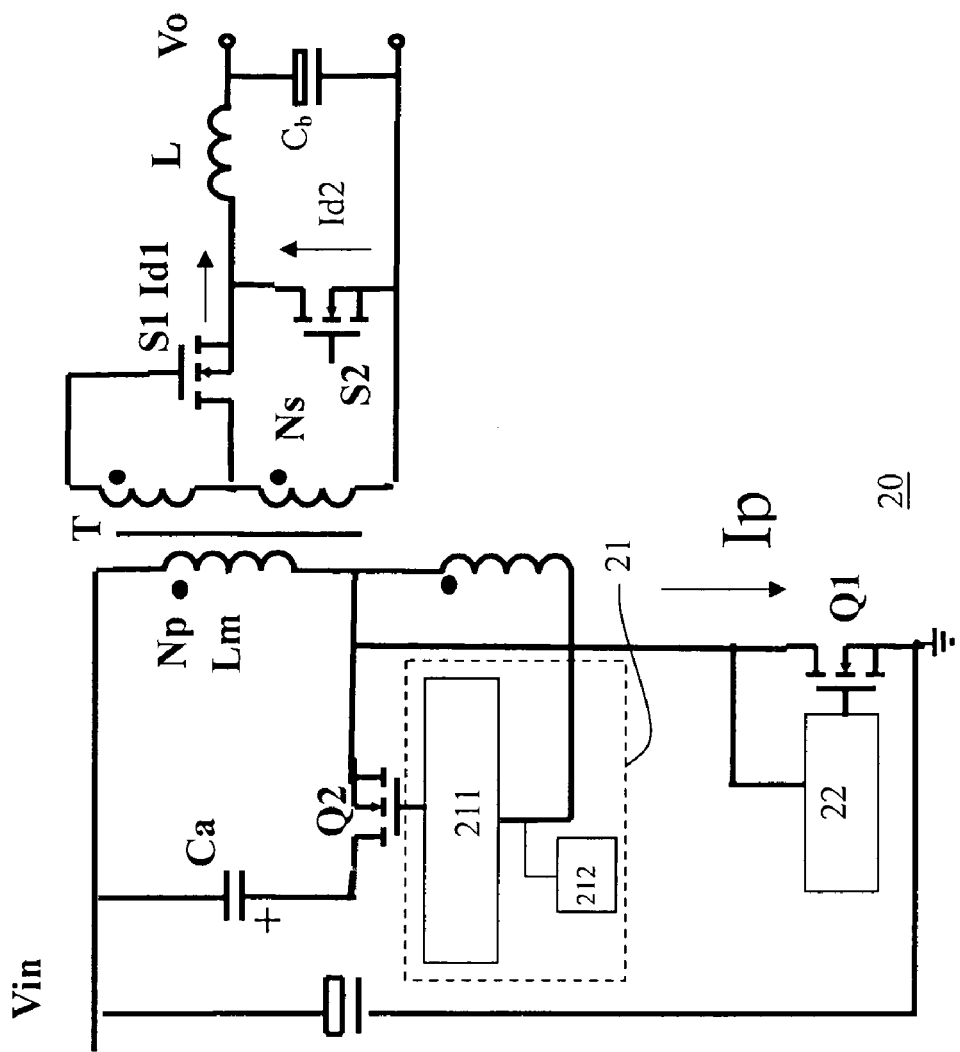
FIG. 2(a) is a schematic diagram showing the preferred embodiment of a power stage circuit of a forward switching power supply of the present invention.
Figure 2B:
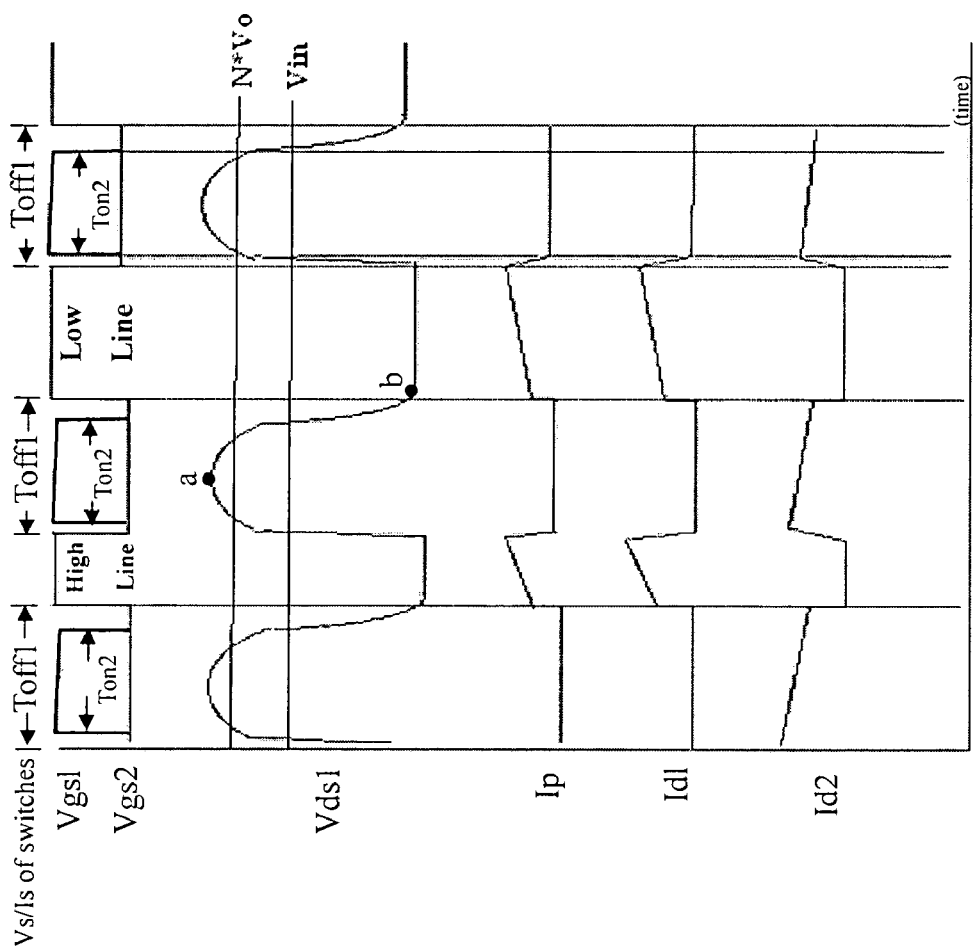
FIG. 2(b) is a graph respectively illustrating the curves of the various voltages and currents of the switches of FIG. 2(a) versus time.

Please refer to FIGS. 2(a) and 2(b), which are the schematic diagram showing the preferred embodiment of a power stage circuit of a forward switching power supply of the present invention and the graph illustrating the curves of the various voltages and currents of the switches of FIG. 2(a) versus time respectively. In which, the switching power supply 20 is a forward switching power supply.

In FIG. 2(a), the switching power supply 20 includes an auxiliary circuit having an auxiliary capacitor Ca and an auxiliary switch Q2, a main switch Q1, a transformer T having a turn ratio of N (N=Np/Ns), a first rectifying switch S1, a second rectifying switch S2, a filter circuit having a filter inductor L and a filter capacitor Cb, an auxiliary switch control circuit 21 and a ZVS detector 22.

Referring to FIG. 2(a), the auxiliary capacitor Ca is electrically connected to the auxiliary switch Q2 in series and both of which are electrically connected to the primary side of the transformer T in parallel. The first terminal of the main switch Q1 is electrically connected to the primary side of the transformer T and the ZVS detector 22, the second terminal of the main switch Q1 is electrically connected to the ground and the input terminal Vin, and the control terminal of the main switch Q1 is electrically connected to the ZVS detector 22. The auxiliary switch control circuit 21 is electrically connected to the control terminal of the auxiliary Q2 and the primary side of the transformer T. The auxiliary switch 21 includes a driver 211 and a timer 212. Notice that the preferred embodiment of the driver 211 of FIG. 2(a) is a primary winding of the transformer T. One with an ordinary skill in the field would know that there are other devices employed as the driver 211 of the auxiliary switch Q2.

Besides, the first rectifying switch S1 and the second rectifying switch S2 are electrically connected to the secondary side of the transformer T, and the filter inductor L and the filter capacitor Cb are electrically connected to the first and the second terminals of the second rectifying switch S2 respectively.

To achieve the purpose of accomplishing ZVS of the main switch Q1, the first controlling method provided in the present invention (referring to FIG. 2(a)) includes the step of: fixing the turn-on time of the auxiliary switch Q2 (Ton2, see FIG. 2(b)) through the auxiliary switch control circuit 21 to achieve the effect of fixing the turn-off time of the main switch Q1 (Toff1, see FIG. 2(b)). That is to say, the driver 211 of the auxiliary switch control circuit 21 is employed to control the auxiliary switch Q2, and the timer 212 is employed to calculate the time such that the turn-on time of the auxiliary switch Q2 is fixed. In FIG. 2(b), the curves of the gate-source voltage of Q1, Vgs1, the gate-source voltage of Q2, Vgs2, the drain-source voltage of Q1, Vds1 (Vin is the input voltage and Vo is the output voltage), the current Ip of Q1, the current Id1 of S1 and the current Id2 of S2 versus time are shown. Furthermore, the "High Line" period of FIG. 2(b) marks where the input voltage of the input terminal Vin is on a relatively high level, and the "Low Line" period of FIG. 2(b) marks where the input voltage of the input terminal Vin is on a relatively low level. One with an ordinary skill in the field would know that the turn-on time of the main switch Q1 during the "High Line" period is relatively shorter than the turn-on time of the main switch Q1 during the "Low Line" period. As shown in FIG. 2(b), the primary winding Lm is resonant with the auxiliary capacitor Ca at the locations such as "a" when the auxiliary switch Q2 is turned on. The ZVS detector 22 could detect the ZVS locations at the first terminal of the main switch Q1 and turn on the main switch Q1 at the locations such as "b" of FIG. 2(b). Which would result in that the turn-off time of the main switch Q1 is also fixed so as to accomplish ZVS at the first terminal of the main switch Q1.

Figure 3A:
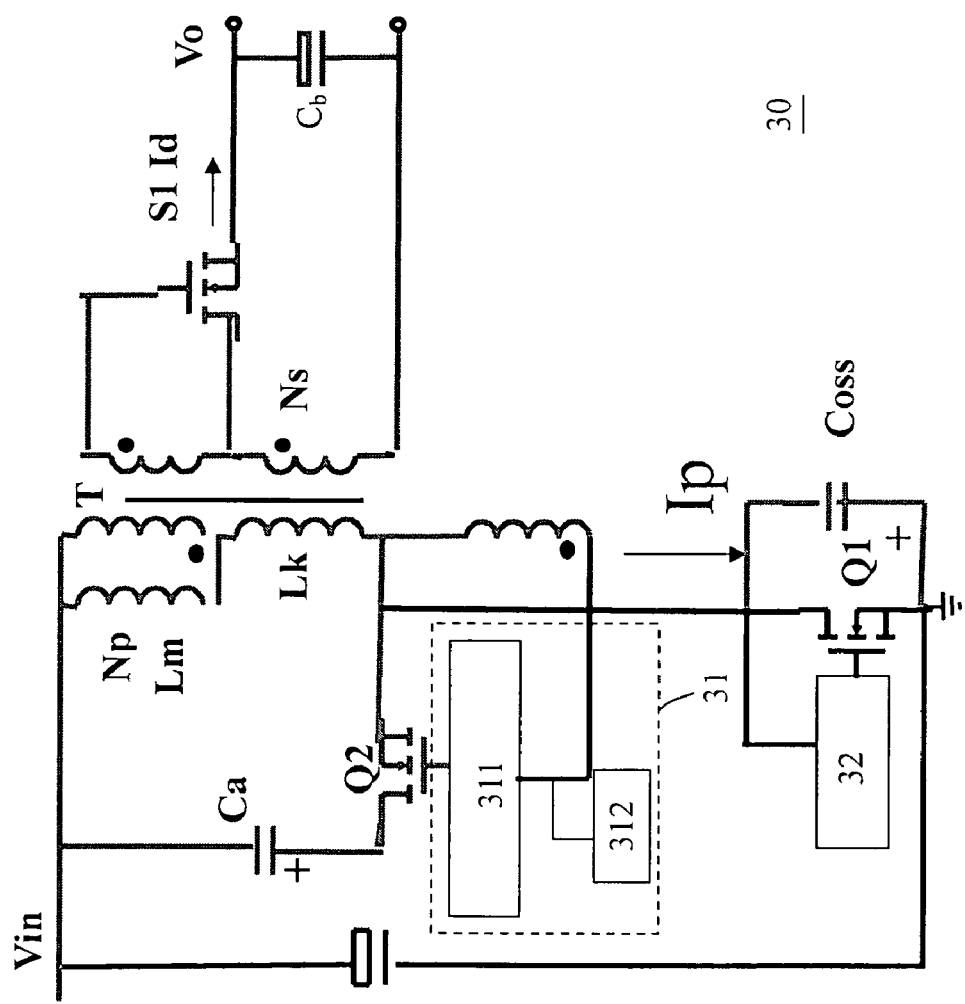
FIG. 3(a) is a schematic diagram showing the preferred embodiment of a power stage circuit of a flyback switching power supply of the present invention.
Figure 3B:
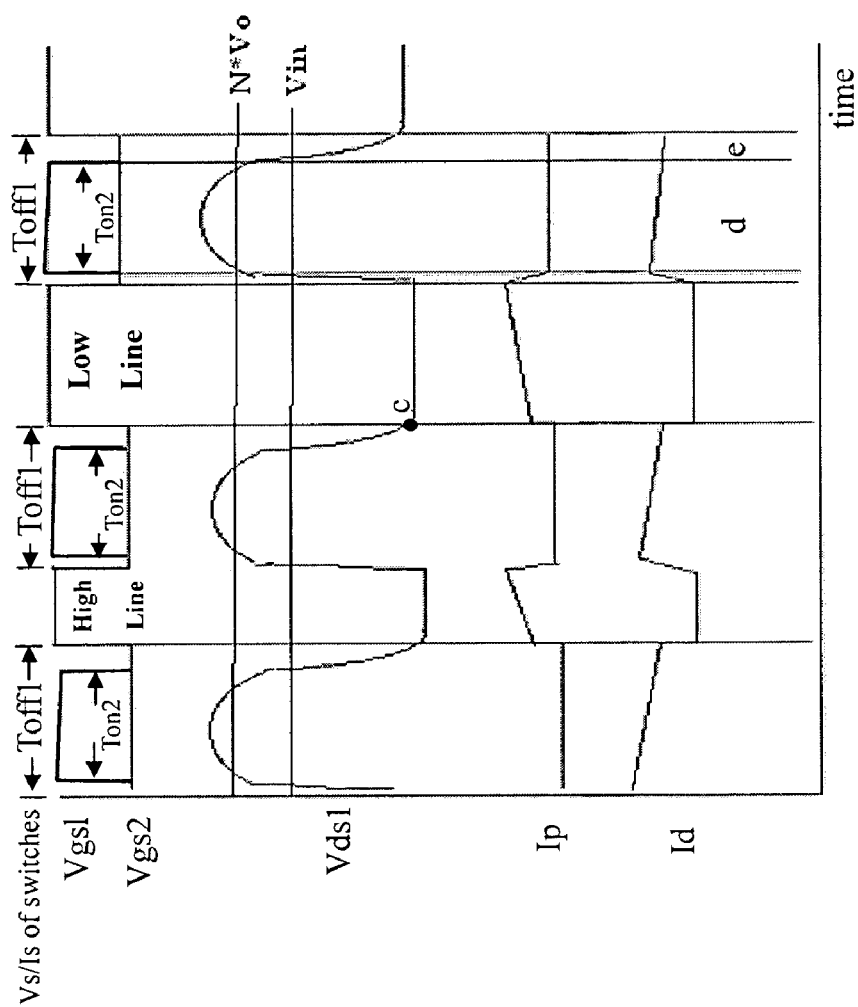
FIG. 3(b) is a graph respectively illustrating the curves of the various voltages and currents of the switches of FIG. 3(a) versus time.

Please refer to FIGS. 3(a) and 3(b), which are the schematic diagram showing the preferred embodiment of a power stage circuit of a flyback switching power supply of the present invention and the graph illustrating the curves of the various voltages and currents of the switches of FIG. 3(a) versus time respectively. In which, the switch power supply 30 is a flyback switching power supply.

In FIG. 3(a), the switching power supply 30 includes an auxiliary circuit having the auxiliary capacitor Ca and the auxiliary switch Q2, the main switch Q1, a capacitor Coss, the transformer T having the turn ratio of N (N=Np/Ns) and the primary windings Lm and Lk, the first rectifying switch S1, a filter circuit having the filter capacitor Cb, an auxiliary switch control circuit 31 having a driver 311 and a timer 312 and a ZVS detector 32. Notice that the second rectifying switch S2 and the filter inductor L of FIG. 2(a) are omitted.

Similar to the aforementioned first controlling method provided according to the preferred embodiment of FIGS. 2(a)

and 2(*b*), the second controlling method provided in the present invention (referring to FIG. 3(*a*)) includes the step of: fixing the turn-on time of the auxiliary switch Q2 (Ton2, see FIG. 3(*b*)) through the auxiliary switch control circuit 31 to achieve the effect of fixing the turn-off time of the main switch Q1 (Toff1, see FIG. 3(*b*)). That is to say, the driver 311 of the auxiliary switch control circuit 31 is employed to control the auxiliary switch Q2, and the timer 312 is employed to calculate the time such that the turn-on time of the auxiliary switch Q2 is fixed. Similarly, the curves of the gate-source voltage of Q1, Vgs1, the gate-source voltage of Q2, Vgs2, the drain-source voltage of Q1, Vds1 (Vin is the input voltage and Vo is the output voltage), the current Ip of Q1 and the current Id of S1 versus time are shown in FIG. 3(*b*). Besides, the "High Line" period also marks where the input voltage of the input terminal Vin is on a relatively high level, and the "Low Line" period marks where the input voltage of the input terminal Vin is on a relatively low level too. By the same token, one with an ordinary skill in the field would know that the turn-on time of the main switch Q1 during the "High Line" period is relatively shorter than the turn-on time of the main switch Q1 during the "Low Line" period. The main differences between the first and the second controlling methods are: the primary winding Lk is resonant with the auxiliary capacitor Ca at the locations such as "d" when the auxiliary switch Q2 is turned on, and the primary winding Lk is resonant with the capacitor Coss at the locations such as "e" when the auxiliary switch Q2 is turned off so as to achieve the zero voltage at the first terminal of the main switch Q1 as shown in FIG. 3(*b*). At this moment, the ZVS detector 32 could detect the ZVS locations at the first terminal of the main switch Q1 and turn on the main switch Q1 at the locations such as "c" of FIG. 3(*b*). Which would result in that the turn-off time of the main switch Q1 is also fixed so as to accomplish ZVS at the first terminal of the main switch Q1.

In conclusion, the main purposes of the provided switching power supplies and the controlling methods thereof of the present invention are fixing the turn-on time of the auxiliary switch at the primary side of the transformer of the proposed switching power supply by the auxiliary switch control circuit to fix the turn-off time of the main switch so as to accomplish ZVS at the first terminal of the main switch. The proposed switching power supplies and the controlling methods thereof could be apply to one of a forward switching power supplies and a flyback switching power supply. In the present invention, there is no need for a relatively complex and expensive driver transformer, the proposed controlling methods are relatively simpler than those in the prior art, and the total manufacturing cost is relatively lower.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A switching power supply, comprising:
    an auxiliary circuit, comprising:
        an auxiliary capacitor; and
        an auxiliary switch electrically connected to said auxiliary capacitor in series;
    a transformer having a primary side electrically connected to said auxiliary circuit in parallel and a secondary side;
    an auxiliary switch control circuit electrically connected to said auxiliary switch and said primary side of said transformer and fixing a turn-on time of said auxiliary switch;
    a main switch having a first terminal electrically connected to said primary side of said transformer, a second terminal and a control terminal;
    a zero-voltage switching (ZVS) detector electrically connected to said first and said control terminals of said main switch;
    a first and a second rectifying switches electrically connected to said secondary side of said transformer; and
    a filter circuit electrically connected to said second rectifying switch in parallel,
    wherein said turn-on time of said auxiliary switch is fixed such that a turn-off time of said main switch is also fixed so as to accomplish ZVS of said main switch.

2. The power supply according to claim 1, wherein said auxiliary switch control circuit comprises a driver and a timer.

3. The power supply according to claim 2, wherein said driver is a primary winding of said transformer.

4. The power supply according to claim 1, wherein said ZVS detector is employed to detect a zero voltage of said first terminal of said main switch.

5. The power supply according to claim 1, wherein said auxiliary, said main, said first rectifying and said second rectifying switches are semiconductor switches, and each of said semiconductor switches has a first, a second and a control terminals.

6. The power supply according to claim 1, wherein said filter circuit comprises a filter inductor and a filter capacitor.

7. A switching power supply, comprising:
    an auxiliary circuit, comprising:
        an auxiliary capacitor; and
        an auxiliary switch electrically connected to said auxiliary capacitor in series;
    a transformer having a primary side electrically connected to said auxiliary circuit in parallel and a secondary side;
    an auxiliary switch control circuit electrically connected to said auxiliary switch and said primary side of said transformer and fixing a turn-on time of said auxiliary switch;
    a main switch having a first terminal electrically connected to said primary side of said transformer, a second terminal and a control terminal;
    a zero-voltage switching (ZVS) detector electrically connected to said first and said control terminals of said main switch;
    a rectifying switch having a first terminal electrically connected to said secondary side of said transformer, a second terminal and a control terminal; and
    a filter circuit having a first terminal electrically connected to said second terminal of said rectifying switch and a second terminal electrically connected to said secondary side of said transformer,
    wherein said turn-on time of said auxiliary switch is fixed such that a turn-off time of said main switch is also fixed so as to accomplish ZVS of said main switch.

8. The power supply according to claim 7, wherein said auxiliary switch control circuit comprises a driver and a timer.

9. The power supply according to claim 8, wherein said driver is a primary winding of said transformer.

10. The power supply according to claim 7, wherein said ZVS detector is employed to detect a zero voltage of said first terminal of said main switch.

11. The power supply according to claim 7, wherein said auxiliary, said main and said rectifying switches are semiconductor switches.

12. The power supply according to claim 7, wherein said filter circuit comprises a filter capacitor.

13. A controlling method for zero-voltage switching (ZVS) a switching power supply, wherein said switching power supply comprises a transformer having a primary side and a main and an auxiliary switches electrically connected to said primary side of said transformer, comprising the steps of:

(a) fixing a turn-on time of said auxiliary switch; and (b) generating a fixed turn-off time of said main switch accordingly so as to accomplish ZVS of said main switch.

14. The method according to claim 13, wherein said switching power supply is one of a forward switching power supply and a flyback switching power supply.

\* \* \* \* \*